(12) United States Patent
Heger et al.

(10) Patent No.: US 8,209,816 B2
(45) Date of Patent: Jul. 3, 2012

(54) LOCKING HINGE FOR AN EXTERIOR VEHICLE MIRROR ASSEMBLY

(75) Inventors: Sebastian Heger, Bad Windsheim (DE); Jürgen Pfanz, Schillingsfürst (DE); Werner Lang, Ergersheim (DE)

(73) Assignees: Lang-Mekra North America, LLC, Ridgeway, SC (US); Mekra Lang GmbH & Co. KG., Ergersheim (DE)

( * ) Notice: Subject to any disclaimer, the term of this patent is extended or adjusted under 35 U.S.C. 154(b) by 118 days.

(21) Appl. No.: 12/894,353

(22) Filed: Sep. 30, 2010

(65) Prior Publication Data

US 2011/0083300 A1  Apr. 14, 2011

(30) Foreign Application Priority Data

Oct. 9, 2009 (DE) ............... 20 2009 013 767 U

(51) Int. Cl.
*E05D 11/10* (2006.01)
(52) U.S. Cl. ............ 16/334; 16/330; 359/838; 359/872
(58) Field of Classification Search ............ 16/334, 16/330, 303, 295, 289, 306, 307; 248/476, 248/479, 478, 477; 359/838, 841, 844, 871, 359/872, 877
See application file for complete search history.

(56) References Cited

U.S. PATENT DOCUMENTS

| | | | | |
|---|---|---|---|---|
| 365,413 | A * | 6/1887 | Stuart ............................. 278/64 |
| 2,546,590 | A * | 3/1951 | Ferrel ............................. 16/302 |
| 2,844,971 | A * | 7/1958 | Debuit .............................. 74/527 |
| 3,015,126 | A * | 1/1962 | Ahlgren ............................ 16/386 |
| 4,186,905 | A * | 2/1980 | Brudy ............................ 248/478 |
| 4,729,134 | A * | 3/1988 | Hillebrand et al. ................ 4/236 |
| 6,371,620 | B1 * | 4/2002 | Lang et al. ..................... 359/872 |
| 6,807,679 | B1 * | 10/2004 | Wang-Lee .......................... 2/10 |
| 7,452,088 | B2 * | 11/2008 | Brester et al. ................. 359/841 |
| 7,735,196 | B2 * | 6/2010 | Centmayer et al. ............. 16/334 |
| 2005/0134984 | A1 * | 6/2005 | Kuo ................................ 359/879 |
| 2008/0310041 | A1 * | 12/2008 | Sinelli et al. .................. 359/879 |
| 2009/0261226 | A1 * | 10/2009 | Branham ....................... 248/477 |

* cited by examiner

*Primary Examiner* — Chuck Y. Mah
(74) *Attorney, Agent, or Firm* — McNair Law Firm, P.A.; Seann P. Lahey

(57) ABSTRACT

A first locking arm connected to a second locking arm on a locking hinge axis. A pair of bearing surfaces on the first locking arm have a first axial spacing, and the second locking arm having a bearing block carrying bearing counter surfaces engaging the bearing surfaces providing a hinged connection between the locking arms. The bearing counter surfaces having a second axial spacing. A first locking element having a first locking surface affixed on one of the bearing surfaces, and a second locking surface affixed on one of the bearing counter surfaces engaging the first locking surface. A spring element biasing the first and the second locking surfaces together. The first axial spacing is less than the second axial spacing so that there is a second spring force acting on the first and second locking surfaces superimposed on the first spring force.

19 Claims, 2 Drawing Sheets

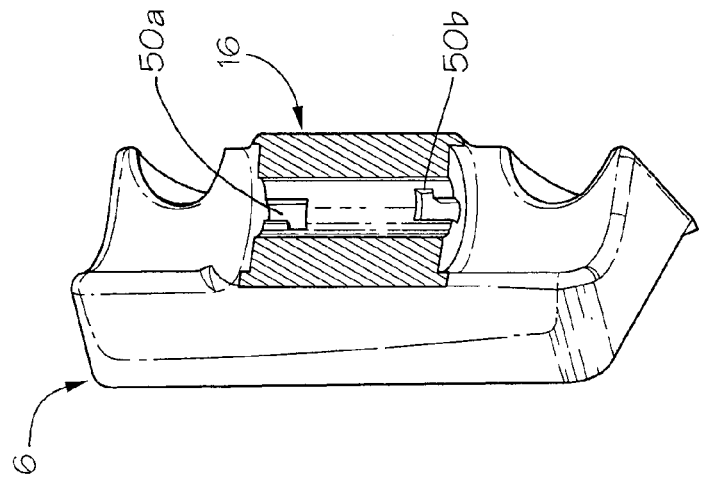
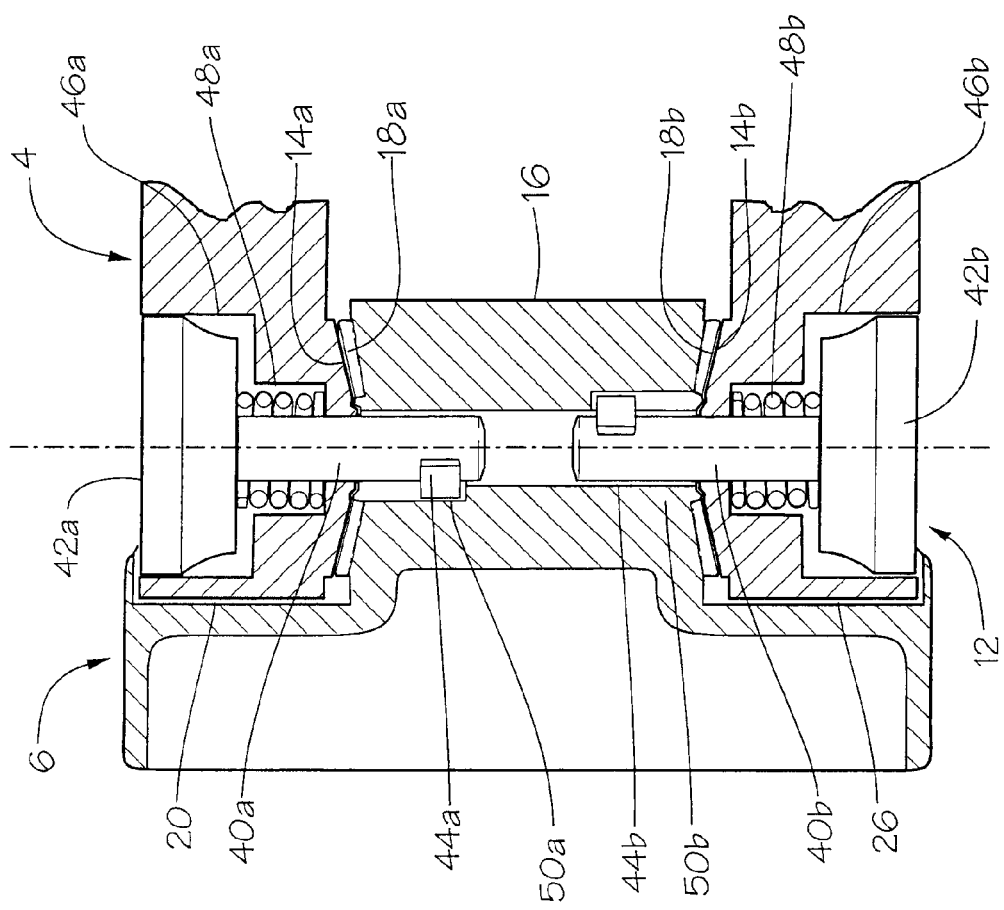

LOCKING HINGE FOR AN EXTERIOR VEHICLE MIRROR ASSEMBLY

BACKGROUND OF THE INVENTION

1) Field of the Invention

The present invention relates to a locking hinge, and more particularly, to an exterior vehicle mirror assembly having a locking hinge for positioning a mirror head on pivotally connected support arms.

2) Description of Related Art

Locking hinges are used in diverse forms for the hinged fixture of rearview mirrors in automobiles. In the simplest form, such a locking hinge contains one first and one second locking arm that end in cooperating, generally identical, locking members. The locking members have cylindrical locking surfaces that face each other and both the locking arms or locking members are pressed and braced against each other with the help of a screw with a spring that goes through both of them.

The disadvantage with this known type of locking hinge is that there is no flexibility whatsoever with respect to the design. Moreover, such locking hinges are relatively big and are characterized by a large weight. Finally, such locking hinges in the above mentioned rudimentary design are visually less attractive.

In addition, there are locking hinges known for automobile exterior mirrors with which the first locking arm is formed by one leg of the mirror, which is joined to the automobile. A primarily horizontally stretched first locking member is provided on the first locking arm. A second locking member of a second locking arm in the shape of a pipe is arranged on the first locking member. Both the locking members are connected to one another with a primarily vertically aligned screw with a spring, and braced against one another. The pipe-shaped locking arm stretches somewhat at right angles to the screw axis. This known form of locking hinge is also characterized by a relatively large construction.

There are other known types of locking hinges, which have one thing in common, which is that they have one or more locking surfaces that are kept under tension with the help of separate screws and/or spring elements.

Locking hinges, especially for the exterior mirrors of utility vehicles are exposed to considerable stresses and loads in daily use. These loads and stresses include force caused by vibrations that are sustained over long periods of time, moderate to medium load forces, particularly by wind, as well as brief and shock type of loads when the exterior mirror held by the locking hinge bangs against an obstacle.

Locking hinges with spring elements that operate as the retention force for holding the assembly together have the disadvantage that in the event of failure of the spring element, for example, breakage of the spring owing to the types of loads mentioned above, the locking hinge can lose its retaining feature or, at least, the retention or holding feature is impaired considerably.

Accordingly, it is an object of the present invention to design a locking hinge and holder arms in such a manner that even in the case of failure of the spring element resulting from a force on the locking hinge, the hinge does not lose its locking connection and retaining features completely.

Further, it is another object of the present invention to provide a lighter weight and visually pleasing design for a locking hinge in an exterior vehicle mirror assembly.

SUMMARY OF THE INVENTION

The above objectives are accomplished according to the present invention by providing a locking hinge having one first and one second locking arm, which are arranged around a locking hinge axis in a pivot assembly and can be fixed to one another in at least one position; a hinge axis arrangement to connect both locking arms at a pivot, whereby the first locking arm has two bearing surfaces for the hinge axis arrangement that lie on the locking hinge axis pointing to one another and at an axial spaced distance from one another, and the second locking arm has a bearing block that is penetrated by the hinge axis arrangement and has two bearing surfaces that lie on the locking hinge axis at a second axial distance from each other and which interact with the bearing surfaces to the pivot connection of the first and second locking arm; at least one first locking element, which has one first locking surface on one of the bearing surfaces and a second locking surface on the associated opposite bearing surface, whereby the first or the second locking surface respectively is arranged in a fixed manner to the bearing surface or the opposite bearing surface; and at least one spring element, which acts on the first and second locking surfaces with an initial spring force and holds them in a locking position.

In accordance with the present invention, the first axial spacing between the two bearing surfaces is less than the second axial spacing between the two bearing surfaces, so that there is a spring force acting on the first and second locking surfaces, and where this force is superimposed on the first spring force.

Owing to the fact that the first axial spacing between the two bearing surfaces is less than the second axial spacing between them, the first and second locking surfaces are acted upon by the spring force inherent to the material of the first locking arm in the direction of the locking arrangement, with this spring force being superimposed on the first spring force. Thus, even if the spring element fails, for example, as a result of breakage of the spring or owing to general fatigue of the spring element caused by long-term sustained vibrations or similar, the second spring force is available as before, which then retains the locking position. Since this second spring force is not generated by a separate spring element, but, instead, by the inherent elasticity or spring action of the material used for the first locking arm, the separate spring element can be supported and relieved during normal operation of the locking hinge, and, hence, longer life of this spring element can be ensured. Further, in the event of failure of this spring element, there is a second spring action available, provided by the inherent property of the material used, which retains the locking position of the locking hinge.

It is preferable to provide a second locking element apart from the first locking element, which is primarily designed in the same manner as the first one. As a result of this, there is a symmetric distribution of forces, and, in particular, an enhancement of the locking position that can be achieved with the locking hinge between both the locking arms.

It is preferred to have the first locking arm designed in the form of two legs, which are connected directly or indirectly at one of their ends and have the bearing surfaces respectively with the first locking surfaces at both their free ends. The first locking arm can, thus, for example, be in the shape of a U or a V, whereby a mirror housing is placed at the connecting leg of the U or in the area of the tip of the V. The two free ends of the legs of the U or V with the bearing surfaces, on which the first locking surfaces are placed or formed, have a slight spacing between one another, which is less than the spacing of the second set of locking surfaces. Thus, the legs of the U or V must be expanded or stretched for the operation of the first and second locking elements, so that the free ends can be snapped on to the bearing block of the second locking arm, and thus, generate the second spring action. This enables assembly without the need for sophisticated tools, and with appropriate selection of the material and/or shape (length, geometry and cross-section of the legs) and the spacing or slight distance of both the legs, the spring force that can be achieved in this manner can be determined in advance and adjusted accurately.

In a preferred design variant, the bearing block on the second locking arm is cylindrical and the bearing surfaces lie on the front side of the cylinder. This particularly facilitates an aesthetically attractive design of the locking hinge.

The hinge axis arrangement, in addition, can preferably have at least one axis bolt, which lies coaxially on the locking hinge axis that has at least one locking element on the first locking arm and goes through the bearing block. As a result of this, the locking surfaces get centered and guided into the locking element.

If the axis bolt has a retaining mechanism at one of its ends, whereby a corresponding counter holding mechanism is arranged on the inside of the bearing block, the positioning of the axis bolt is fixed and ensured in a beneficial manner.

It is also preferred that the axis bolt has a crown-shaped extension at its other end, which fits accordingly in an appropriate recess on the first locking arm. As a result, on the one hand, the axis bolt can be handled in a better manner, and provides a correspondingly large surface for a tool owing to the crown-shaped extension, and, on the other hand, specific penetration depth of the axis bolt is ensured by guiding the extension in an appropriately formed recess.

In the process, the second spring element can be tensioned while the axis bolt is being guided between the crown-shaped extension and one base of the recess by the locking element into the bearing block. This spring element, which can preferably be a helical compression spring around the shaft of the axis bolt, thus supports itself at one end on the crown-shaped extension and on the other end at the base of recess, so that the compressive force generated by the spring acts axially, that is, in the direction of the locking hinge axis on both the locking surfaces of the first locking element.

What is particularly preferred is that both locking elements are penetrated respectively by an axis bolt, which have the preferred forms indicated above and compresses opposing spring elements, so that symmetric forces are present in turn.

The holding mechanism and the counter holding mechanism for the axis bolts are preferably formed by using a bayonet slot connection. This bayonet slot connection is of simple construction with a retainer projecting from the axis bolt being received into an L-shaped slot in the bearing block. The bayonet slot connection does not require any special tool to lock or loosen the axis bolt from the bearing block and is self-locking owing to the spring element under compression, that is, it is capable of withstanding vibrations and shocks.

The subject matter of the current patent is also an exterior mirror having at least one locking hinge in accordance with the details of the present invention.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 2 shows a cross-section view of the locking hinge according to the present invention; and, FIG. 3 shows a cut-away view of the bearing block according to the present invention.

Figure 1:
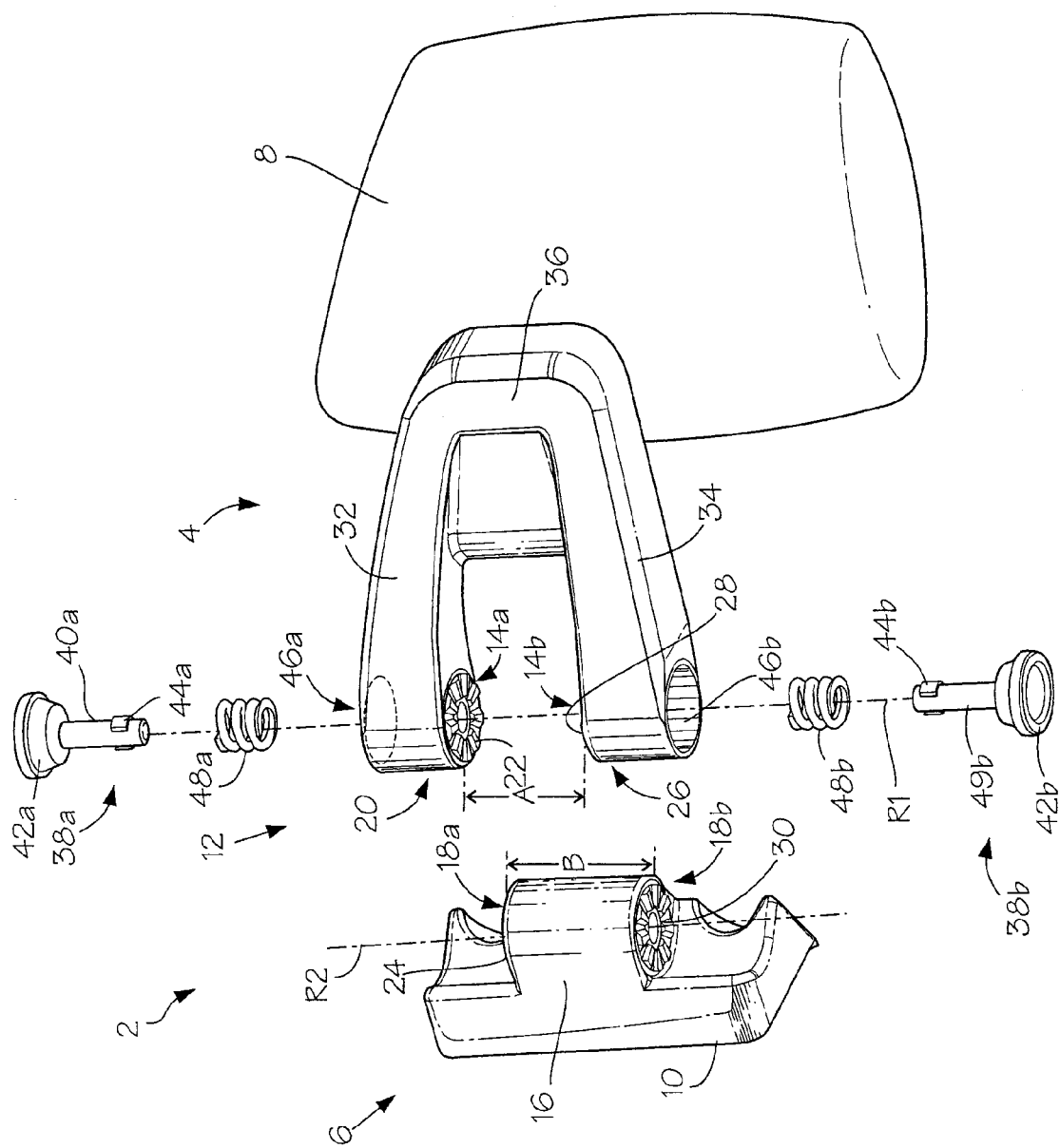
FIG. 1 shows an exploded perspective view of the locking hinge according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings of FIGS. 1 and 2, the invention will now be described in more detail. The locking hinge, designated generally as 2, primarily consists of one first locking arm, 4, and one second locking arm, 6, whereby the first locking arm 4 serves to hold an exterior mirror head, 8, and the second locking arm, 6, is fixed to a vehicle body (not shown). For this purpose, the second locking arm, 6, has a base, 10, which can be screwed on to the body of the vehicle. The first locking arm, 4, and the second locking arm, 6, are pivoted to one another around a hinge axis, and can be fixed to one another in at least one relative position, which is represented in the disassembled drawing by two dotted lines, R1 and R2.

A hinge axis arrangement, designated generally as 12, is provided between the first locking arm, 4, and the second locking arm, 6, for this purpose.

The first locking arm, 4, has two bearing surfaces, 14a and 14b for the hinge axis arrangement, 12, which face one another and lie at an axial spacing of A to one another on the locking hinge axis, R1. The second locking arm, 6, has a bearing block, 16, on the base, 10, which is receives the first locking arm, 4, and has two bearing counter surfaces, 18a and 18b, which interact with the bearing surfaces 14a and 14b of the first locking arm, 4, for the pivot connection of the first locking arm, 4, and the second locking arm, 6. The two bearing counter surfaces, 18a and 18b, lie at a second axial spacing of B to one another on the locking hinge axis, R2.

In the region of at least one of the bearing surfaces, 14a and 14b and the bearing surfaces 18a and 18b, preferably on both bearing surfaces or counter surfaces, there are locking elements, through which the relative position of the first locking arm, 4, and the second locking arm, 6, can be fixed preferably in a number of defined locking positions.

In accordance with the illustrated representation, one first locking element, designated generally as 20, is provided for this purpose, which has one first locking surface, 22, defined by a series of grooves and ridges on the bearing surface, 14a, of the first locking arm, and a second locking surface, 24, also defined by a series of grooves and ridges on the associated bearing counter surface, 18a, of the bearing block, 16. In a similar manner, a second locking element, designated generally as 26, has been provided, which has another first locking surface, 28, on the side of the bearing surface 14b and another second locking surface, 30, on the side of the bearing counter surface, 18b.

The locking surfaces, 22 and 24, or 28 and 30, are arranged on the bearing surfaces 14a and 14b, or on the bearing counter surfaces 18a and 18b, so that they are fixed and cannot rotate, for example, formed of a single molded piece.

For arranging or forming the bearing counter surfaces, 18a and 18b, or the locking surfaces, 24 and 30, the bearing block, 16, has a cylindrical design as is evident from the drawing, whereby the respective surfaces are arranged or formed on both ends of the cylinder defining bearing block 16.

The first locking arm, 4, has the U-shaped design with two legs, 32 and 34, as seen clearly in the drawing, and has a connecting piece, 36, at one end of one of these legs, 32 and 34. The mirror head, 8, is fixed to the locking arm in the area of the connecting piece, 36.

The locking elements, 20 and 26, are located at the free ends of the legs, 32 and 34.

Instead of the U shape of the first locking arm, 4, illustrated in the drawing, it can, for example, also have a V shape, a W shape, a Y shape or something similar. What is decisive with respect to the shape of the locking arm, 4, is that there are two legs obtained similar to the legs, 32 and 34, which support the locking elements, 20 and 26 at their free ends.

The hinge axis arrangement 12, in addition, has one axis bolt, 38a, on the side of the leg, 32, which, while lying coaxially on the locking hinge axis R1 (R2), penetrates the locking element, 20, on the first locking arm, 4, or at the leg, 32, and is guided into the bearing block, 16. In the process, one shaft, 40a, of the axis bolt, 38a, penetrates the first locking surface 22, and the second locking surface, 24, of the first locking element, 20.

A crown-shaped extension, 42a, is formed at one end of the shaft, 40a, of the axis bolt, 38a. Retainers, 44a, are formed on the opposite end of the shaft, 40a, with which the shaft, 40a, and, thus, the axis bolt, 38a, can be fixed in the interior of an appropriate bore hole of the bearing block. Further referring to FIG. 3, in one embodiment, bearing block, 16, includes bayonet sockets, 50a, in the form of an L-shaped groove that receives retainers, 44a, for securing axis bolt, 38a, in bearing block, 16.

Another axis bolt, 38b, is provided in the region of the leg, 34, which has a shaft, 40b, crown-shaped extension, 42b, and a retainer, 44b, in a manner similar to that of the axis bolt, 38a. As can be seen from the drawing, the extension, 42a or 42b is sized in such a manner so that it can be placed flush with the recess, whereby, only the recess, 46b, on the side of the leg, 34, is visible in the drawing. Further referring to FIG. 3, in one embodiment, bearing block, 16, includes bayonet sockets, 50b, in the form of an L-shaped groove that receives retainers, 44b, for securing axis bolt, 38b, in bearing block, 16.

A helical compression spring is placed around the shaft, 40a, of the axis bolt, 38a. In the same manner, a helical compression spring is placed around the shaft, 40b, of the axis bolt, 38b. In the assembled condition of the locking hinge, the springs, 48, support themselves with one winding end at the bottom surface of the recess, 46.

The material and/or dimensions and/or cross-section shapes of the legs, 32 and 34 or the entire locking arm, 4, have been selected in such a manner, that both the legs, 32 and 34 can be elastically deformed in such a way that the spacing, A, between the two locking elements, 20 and 26, can be changed, and particularly be increased, by elastic deformation of the legs, 32 and 34, in such a manner that it is at least the same, and preferably larger than the spacing, B, between the locking surfaces 24 and 30 on the side of the second locking arm, 6.

To assemble the locking hinge from the disassembled condition as illustrated in the drawing, both legs, 32 and 34 of the first locking arm, 4, are forced out of each other (bent), so that the locking surfaces 22 and 24, or 28 and 30 can be pushed over one another. In the course of assembly, thus, tentatively, A>B.

After the respective locking surfaces have been brought over one another in a covering position, there is no stretching force anymore on the legs, 32 and 34, so that these then try to return to the initial un-stretched position in which A<B, owing to the inherent spring action of the material. As a result, a spring action is caused, which brings the respective locking elements, 20 and 26 in the locking position. Depending on the design of the locking elements, the first locking arm, 4, can thus be aligned with the second locking arm, 6, fixed to the vehicle body, in a number of latching positions. In the same way, it is possible to adjust and retain only one defined relative position of both locking arms, 4 and 6, with the help of the locking elements, 20 and 26.

In the following, the compression springs, 48a and 48b are pushed into the shafts, 40a and 40b of the axis bolts, 38a and 38b, and the axis bolts, 38a and 38b are guided into the recesses, 46a and 46b, by compression of the respective springs, so that they penetrate the locking elements, 20 and 26, or the locking surfaces there, and come to rest in the interior of the bearing block, 16. The retainers, 44a and 44b, move into the interior of the bearing block and are received in corresponding counter retainers 50a and 50b, for locking in the bearing block 16. What is preferred particularly in this process, is that the respective retainers are designed in the form of a bayonet received in a bayonet socket, which is then self-retaining and insensitive to vibrations under the restoring force of the compression springs, 48a and 48b.

Apart from at least one helical compression spring, 48 (or the helical compression springs, 48a and 48b in the design variant illustrated in the drawing), the interior spring action of the locking arm, 4, is also used by the subject matter of the present patent to generate the forces required to hold the locking position in the locking elements, 20 and 26.

The respective forces get added to one another in the process, such that there is an opposing force created so that, for example, in the event of breakage or fatigue of one component, which generates the spring action, there are two other components available, which have the capacity to continue providing adequate retaining force.

Apart from the axis bolts, 38 and 48, which are already known in locking hinges of designs under consideration, there are no other separate components or special constructive designs required in the region of the locking hinge, in order to generate additional locking and retaining forces, since these are obtained from the inherent material elasticity of the first locking arm alone.

In this manner, a second spring action can be obtained from the first locking arm, 4, which supplements the spring forces already available on account of at least one helical compression spring, 48, whereby this second spring action can be adjusted purely by key constructive parameters, for example, by the ratio of A to B, by the material or the length of the cross-sectional shape or the wall thickness, etc. of the legs, 32 and 34 or by the general shape of the first locking arm, 4 (U shape, V shape, etc.).

While a preferred embodiment of the invention has been described using specific terms, such description is for illustrative purposes only, and it is to be understood that changes and variations may be made without departing from the spirit or scope of the following claims.

What is claimed is:

1. An exterior vehicle mirror assembly having a locking hinge, comprising:
    a first locking arm and a second locking arm pivotally arranged around a locking hinge axis such that they can be swiveled with respect to one another and can be fixed in at least one position relative to the other;
    said first locking arm having a pair of bearing surfaces arranged facing each other and have a first axial spacing between one another on said locking hinge axis;
    said second locking arm having a bearing block having a pair of bearing counter surfaces thereon and arranged to engage with said bearing surfaces of said first locking arm to create a hinged connection between said first and second locking arms, and said bearing counter surfaces having a second axial spacing between one another defined by said bearing block along the locking hinge axis;
    a first locking element having a first locking surface affixed on one of said bearing surfaces of said first locking arm, and a second locking surface affixed on one of said bearing counter surfaces of the bearing block engaging said first locking surface;
    a spring element biasing said first and said second locking surfaces together using a first spring action; and,
    wherein said first axial spacing between said bearing surfaces on said first locking arm in an un-stretched state is less than said second axial spacing between said bearing counter surfaces on said bearing block, so that there is a second spring force generated by elasticity of the first locking arm acting on said first and second locking surfaces which is superimposed on said first spring force.

2. The assembly of claim 1 including a second locking element having a first locking surface affixed on the other of said bearing surfaces of said first locking arm, and said second locking element having a second locking surface affixed on the other of said bearing counter surfaces of the bearing block.

3. The assembly of claim 2 wherein said first locking arm has two legs interconnected at one of their ends and have said bearing surfaces with said first locking surface at a free end of both said legs.

4. The assembly of claim 3 wherein said bearing block is cylindrical in shape and said bearing counter surfaces are disposed at distal ends.

5. The assembly of claim 4 including at least one axis bolt, arranged to extend coaxially along the locking hinge axis and penetrating at least one of said first locking element and said second locking element from said first locking arm into said bearing block.

6. The assembly of claim 5 wherein said axis bolt includes a retainer for engaging a corresponding counter-retainer disposed in an interior of said bearing block.

7. The assembly of claim 6 wherein said axis bolt includes a crown-shaped extension carried at one end constructed and arranged to fit into a corresponding recess in said first locking arm.

8. The assembly of claim 7 wherein said spring element is compressed between said crown-shaped extension and a base surface of said recess while guiding said axis bolt through said locking element into said bearing block.

9. The assembly of claim 8 wherein said spring element is a helical compression spring around a shaft of said axis bolt.

10. The assembly of claim 9 wherein said first locking element and said second locking element are each penetrated respectively by one said axis bolt.

11. The assembly of claim 10 wherein said retainer comprises a projection extending laterally from said shaft of said axis bolt, and said counter-retainer comprises an L-shaped slot in said interior of said bearing block for receiving said retainer to lock said axis bolt to said bearing block.

12. An exterior vehicle mirror assembly having a locking hinge, comprising:
    a first locking arm carrying a mirror head;
    a second locking arm pivotally connected to said first locking arm;
    a pair of bearing surfaces each having a first locking surface and carried by said first locking arm have a first axial spacing between one another aligned along a locking hinge axis;
    a bearing block carried by said second locking arm having a pair of bearing counter surfaces each with a second locking surface and a second axial spacing between one another along said locking hinge axis, wherein said first locking surfaces engage said second locking surfaces respectfully, defining a locking hinged connection between said first locking arm and second locking arms;
    a spring element biasing each said first locking surface against said second locking surface using a first spring action; and,
    wherein said first axial spacing between said bearing surfaces in an un-stretched state is less than said second axial spacing between said bearing counter surfaces so that a second spring force generated by elasticity of the first locking arm is superimposed on said first spring force acting on said first and second locking surfaces.

13. The assembly of claim 12 wherein said first locking arm has two legs interconnected at one of their ends and have said bearing surfaces at a free end of both said legs.

14. The assembly of claim 13 wherein said bearing block is cylindrical in shape and said bearing counter surfaces are disposed at distal ends for engaging said bearing surfaces on said legs of said first locking arm.

15. The assembly of claim 14 including an axis bolt, arranged to extend coaxially along said locking hinge axis at each of said free ends of said legs, and penetrating each of said bearing surfaces and said counter bearing surfaces from said first locking arm into said bearing block.

16. The assembly of claim 15 wherein each said axis bolt includes a retainer for engaging a corresponding counter-retainer disposed in an interior of said bearing block.

17. The assembly of claim 16 wherein said axis bolt includes a crown-shaped extension carried at one end constructed and arranged to fit into a corresponding recess in said first locking arm.

18. The assembly of claim 17 wherein said spring element is compressed between said crown-shaped extension and a base surface of said recess while guiding said axis bolt through said locking element into said bearing block.

19. The assembly of claim 18 wherein said retainer comprises a projection extending laterally from said shaft of said axis bolt, and said counter-retainer comprises an L-shaped slot in said interior of said bearing block for receiving said retainer to lock said axis bolt to said bearing block.

* * * * *